US011866219B2

(12) United States Patent
Boje et al.

(10) Patent No.: US 11,866,219 B2
(45) Date of Patent: Jan. 9, 2024

(54) LABELING DEVICE FOR APPLYING A LABEL AND METHOD FOR APPLYING A LABEL USING SUCH A LABELING DEVICE

(71) Applicant: Weber Marking Systems GmbH, Rheinbreitbach (DE)

(72) Inventors: Timo Boje, Bad Honnef (DE); Jörg Emrich, Linz (DE); Andres Frings, Rheinbreitbach (DE)

(73) Assignee: Weber Marking Systems GmbH, Rheinbreitbach (DE)

( * ) Notice: Subject to any disclaimer, the term of this patent is extended or adjusted under 35 U.S.C. 154(b) by 0 days.

(21) Appl. No.: 17/891,504

(22) Filed: Aug. 19, 2022

(65) Prior Publication Data

US 2023/0099162 A1 Mar. 30, 2023

(30) Foreign Application Priority Data

Sep. 22, 2021 (DE) ........................ 102021124523.0

(51) Int. Cl.

*B32B 41/00* (2006.01)
*B65C 1/02* (2006.01)
*B65C 9/40* (2006.01)
*B65C 9/08* (2006.01)

(52) U.S. Cl.

CPC ................ *B65C 1/021* (2013.01); *B65C 9/08* (2013.01); *B65C 9/40* (2013.01)

(58) Field of Classification Search

CPC .. B65C 1/021; B65C 9/08; B65C 9/40; B65C 2009/401; B65C 9/26
USPC .................... 156/60, 64, 350, 351, 378, 379
See application file for complete search history.

(56) References Cited

U.S. PATENT DOCUMENTS 9,802,728 B1 * 10/2017 Rodgers .................... B65C 9/02
2014/0096900 A1 * 4/2014 Wojdyla ................ B65C 9/1803 156/247

FOREIGN PATENT DOCUMENTS

| | | | |
|---|---|---|---|
| DE | 19545191 | A1 | 6/1997 |
| DE | 102006047488 | B4 | 12/2017 |
| ES | 2121662 | A1 | 12/1998 |
| JP | H06-24211 | Y2 | 6/1994 |
| JP | 2003-39541 | A | 2/2012 |
| JP | 2001-158413 | A | 6/2012 |

* cited by examiner

*Primary Examiner* — Michael N Orlando
*Assistant Examiner* — Joshel Rivera
(74) *Attorney, Agent, or Firm* — Richard M. Goldberg

(57) ABSTRACT

A labeling device (1) for applying a label to a product (2) located on a conveyor (3), includes an application cell (4), at least two label dispensers (5*a,b*) arranged outside the application cell (4) and an applicator (6), mounted inside the application cell (4), the applicator (6) being adapted to label the product (2) at variable positions on the conveyor (3) individually detected by a measuring system (9) at variable conveyor speeds, such that the labels are applied by a method for applying a label by the labeling device (1).

14 Claims, 2 Drawing Sheets

LABELING DEVICE FOR APPLYING A LABEL AND METHOD FOR APPLYING A LABEL USING SUCH A LABELING DEVICE

BACKGROUND OF THE INVENTION

The invention relates to a labeling device for applying a label to a product located on a conveyor, and to a method for applying a label to a product located on a conveyor by means of such a labeling device.

The requirements for the precise labeling of products are constantly increasing. Products often have to be labeled at the same point in order to guarantee a smooth operating process. Likewise, in shipping centers, for example, a wide variety of products must be processed on a conveyor during the operating process. For example, cartons of different sizes and shapes follow one another and are supplemented by products packed in plastic bags or envelopes. In some cases, the labeling position on a product also depends on existing labels or other markings that should not be covered. These different geometries and surfaces require precise labeling. Likewise, the products to be labeled are often not found in a specific position, but are placed randomly and move steadily along the conveyor belt during the labeling process. In order to be able to apply labels in a precise manner despite this, the accuracy of the labeling process must be further improved.

The application of labels is also frequently associated with high forces and a high dead weight of the components of the labeling devices, which represents a safety risk for persons in the vicinity. For this reason, labeling usually takes place in safety areas that are not freely accessible. In order to carry out maintenance work or material loading on a label dispenser, the entire operation must be interrupted. Only then the safety area can be entered without danger. Each such interruption is time-consuming, disrupts the operating sequence and is economically disadvantageous. In addition, the safety areas often have to be very large, which requires additional space.

SUMMARY OF THE INVENTION

It is therefore the object of the invention to propose a labeling device as well as a method of the type mentioned above, which enable the precise application of labels to products located on a conveyor, with an uninterrupted operating sequence and in compliance with occupational safety measures.

This object is obtained by a labeling device for applying a label to a product located on a conveyor with the features of the apparatus claims as well as by a method for applying a label to a product located on a conveyor by means of a labeling device with the features of the method claims.

Specific embodiments and further developments of the invention are subject of the dependent claims.

According to the apparatus claims, the invention is a labeling device for applying labels to a product located on a conveyor. In this regard, the labels are information carriers and may take various forms. For example, a label may be provided with text, one or more barcodes, one or more QR codes, or an RFID transponder. The product may have any shape and/or surface and may be, for example, a packaging carton, an envelope, or a plastic package. The conveyor on which the product to be labeled is located can assume variable speeds. The conveyor may be designed, for example, as a conveyor belt, roller conveyor or mat chain conveyor. The labeling device comprises an application cell through which the conveyor passes. It is not accessible during operation and is closed off from outside manipulation. This serves, on the one hand, to ensure trouble-free operation and, on the other hand, to protect workers, since modern labeling devices sometimes require considerable force to apply labels and have a large dead weight, which means that they constitute a not inconsiderable potential for injury. The application cell therefore meets the requirements for a safe workplace. Furthermore, the labeling device comprises at least two label dispensers arranged outside the application cell. The arrangement outside the application cell offers the advantage that maintenance work or the loading of material can be carried out outside the hazardous area of the application cell. In the case of prior art labeling devices that have the label dispensers arranged within a safety area, the operating sequence must be completely interrupted for the replacement of label rolls for occupational safety reasons. Then, rolls are often replaced at all existing label dispensers to avoid more frequent stoppages, even if they are not completely used up everywhere. This handling generates unnecessary waste. In comparison, the invention offers the advantage that each label roll can be completely used up before it is replaced during operation. Once a label dispenser runs out of material, the applicator can be supplied by the second or further label dispenser until the material is replenished. This provides a saving of cost and also protects the environment by avoiding unnecessary waste production. Preferably, the label dispensers have a pull-out and/or swivel function so that maintenance and operation are facilitated. The label dispensers can thus also be tilted into a suitable position for label transfer and individually adjusted depending on the type of label, in order to be able to guarantee the best possible transfer in each case. By arranging the label dispensers outside the application cell, the latter can also be laid out in a space-saving manner and takes up little room. In a preferred embodiment, only a length of 90-150 cm along the conveyor is required for the application cell, particularly preferably 100-120 cm. For applying the labels, an applicator is provided which is mounted inside the application cell. The applicator is suitable for labeling the product with pinpoint accuracy. A measuring system is provided for optimum alignment of the applicator. It records individual position data of the product on the conveyor. The individual size, shape and positioning of each product on the conveyor is thus precisely recorded, so that accurate application is guaranteed, even if different products with variable geometries and surfaces are labeled and/or enter the application cell at different positions on the conveyor during the ongoing operating process. This has the advantage that the products do not have to be arranged and aligned in a specific way on the conveyor, as the applicator follows the product based on the captured data and applies the label at the desired position. This results in time savings in the operating process. Preferably, this is an optical measuring system. Further information can also be acquired by the measuring system, for example if one or more labels are already present on the product, so that their information can be read out and included in the current application process. With the aid of the measuring system, for example, relabeling can take place so that an existing label is completely covered by a new label. However, it is also possible to avoid covering the existing label if its information is to remain readable. This also applies to other labels on the product that are to remain readable. Using the data acquired by the measuring system, labeling is thus possible at any desired position on the product surface.

According to one embodiment of the invention, two label dispensers are arranged on opposite sides of the conveyor. In this preferred arrangement of the label dispensers, the applicator only has to be moved back and forth along one linear axis and can be loaded with labels from both label dispensers. This embodiment allows for a simple and less trouble-prone setup of the labeling device.

According to one embodiment of the invention, the applicator comprises a transfer unit for receiving and dispensing the label. The transfer unit receives the label dispensed by the label dispenser and holds it until the applicator is in the correct position for dispensing. The label is then dispensed by the transfer unit and applied to the product. The transfer unit is preferably adapted to the label geometry so that trouble-free transfer of the label is ensured.

According to one embodiment of the invention, the transfer unit is suitable for receiving labels from different label dispensers. For this purpose, it is designed in such a way that the applicator can approach any label dispenser and the transfer unit is capable of taking over the label dispensed by this label dispenser. The applicator can be moved to the label dispensers by means of an arrangement of several linear axes.

According to one embodiment of the invention, the transfer unit fixes the label received from the label dispenser in a detachable manner by means of negative pressure. The locally generated vacuum sucks the label and holds it on the transfer unit. This method of transferring the label is characterized by its uncomplicated handling and fixes the label in a precise position.

According to a further embodiment of the invention, the label can be detached from the transfer unit and applied to the product by using compressed air at the transfer unit. Compressed air is advantageous for dispensing the label because it can be used selectively and quickly and also ensures uniform application. The product is not touched by the applicator, which avoids potential damage to both the applicator and the product.

However, it is also conceivable to solve the dispensing in another way, for example by contact transfer.

In one embodiment, it is provided that the compressed air can be varied over the surface of the transfer unit. For example, the intensity or duration of the compressed air application can vary at different points on the transfer unit. This enables the precise application of labels to products with uneven surfaces. Likewise, products whose surface to be labeled is not at an angle with the transfer unit and the label that is detachably fixed to it can be labeled with pinpoint accuracy.

According to a further embodiment of the invention, the applicator receives the label at a transfer gap in the application cell. For this purpose, the labeling device moves the applicator close to the transfer gap so that the transfer unit can receive the label. The transfer gap is adapted to the size of the labels to be dispensed. Preferably it is not higher than 9 mm, especially preferably not higher than 6 mm. This means that the transfer gap is small enough to prevent accidents at work, for example because it is too narrow to reach into the interior of the application cell with the hand.

According to a further embodiment of the invention, a transfer aid may be provided at the transfer gap for temporarily fixing the label. This transfer aid can, for example, be in the form of a horseshoe in order to stabilize the label from three sides and at the same time enable the applicator to move the transfer unit from the open side of the horseshoe into the transfer aid and to receive the label. Labels that are not received flush may not be applied to the product with positional accuracy because the applicator cannot change their position on the transfer unit. To avoid this, the transfer aid can ensure that the label is received flush. In addition, the transfer aid can increase the operating speed of the labeling device: while the applicator is taking a label from a first label dispenser, the transfer aid of a second label dispenser can already have another label ready, so that there is no waiting time. After dispensing the first label, the applicator can directly receive the second one from the transfer aid and does not have to wait until a new label is dispensed.

In one embodiment of the invention, it is provided that the applicator is linearly movable along at least two axes. Preferably, these axes of movement are arranged at an angle of 90° to each other. This arrangement allows the applicator to be moved flexibly in the application cell so that, on the one hand, it can be loaded without difficulty by a plurality of label dispensers and, on the other hand, the applicator can apply the labels precisely to the products which are located on the conveyor and thus move continuously. It is also conceivable to move the applicator along one or more rotary axes.

According to a further embodiment of the invention, at least one label dispenser comprises a label printer. In this way, labels can be printed directly on the dispenser for a product with a precise fit. Since the label dispenser and thus also the label printer are located outside the application cell, the printer can be operated and settings can be changed during operation.

According to a further embodiment, the measuring system forwards the detected position data of the product to a control unit. The control unit is suitable for aligning the applicator with positional accuracy. In this way, the labeling device is supported in the precise application of the labels even with changing product dimensions,—geometries and different product positioning on the conveyor. This eliminates the need for precise alignment of the products to be labeled on the conveyor, which is not always easy to implement depending on the product properties or disrupts operating processes by taking up more time.

According to a further embodiment, the labeling device is operable when at least one label dispenser is operable. The applicator can optionally be fed with labels from two or more label dispensers, so that the applicator, for example, accesses the label dispenser that is located closer to the product to be labeled or alternately obtains labels from the label dispensers. In one embodiment, however, it can also be fed by only one label dispenser, so that the second can be subjected to maintenance work or loaded with new labels without disrupting the operating sequence. As soon as the second label dispenser is ready for operation again, it can be included again.

According to another embodiment of the invention, the control unit calculates a label position on the product to obtain a maximum throughput. For example, the control unit may determine the foremost position suitable for application using data acquired from the measurement system. The control unit then moves the applicator to such a position that the label is applied to this foremost position on the product in the direction of travel. This allows the greatest possible time interval for labeling the next product, so that a new label transfer from the label dispenser to the applicator and its repositioning is possible without any problems and without loss of time, even at maximum product throughput.

According to another embodiment, the control unit stores position data transmitted by the measuring system for successive products that enter the application cell one after the other on the conveyor. The position data recorded by the measuring system can include both the position of the product on the conveyor device and the surface dimensions of the product. The travel distance of the applicator is determined by an algorithm that uses this stored data to calculate the minimum possible distance between label target positions on successive products. This minimizes the necessary travel distance for the applicator and thus increases the maximum throughput of the labeling device.

Finally, according to the method claims, the invention relates to a method for applying a label by means of a labeling device for applying labels according to any one of the apparatus claims. The method comprises the following steps:

Moving the applicator to a receiving position;
Dispensing the label from the label dispenser;
Receiving the label by the applicator;
Acquisition of position data of the product;
Moving the applicator to a dispensing position;
Application of the label on the product by the applicator.

The sequence of the steps can change among themselves in a meaningful way, for example, position data of the product can be acquired first and then the label can be dispensed and received by the applicator or vice versa.

BRIEF DESCRIPTION OF THE DRAWINGS

The invention is further explained below with reference to an example of an embodiment in the drawing.

It is shown in.

DETAILED DESCRIPTION

Figure 1B:
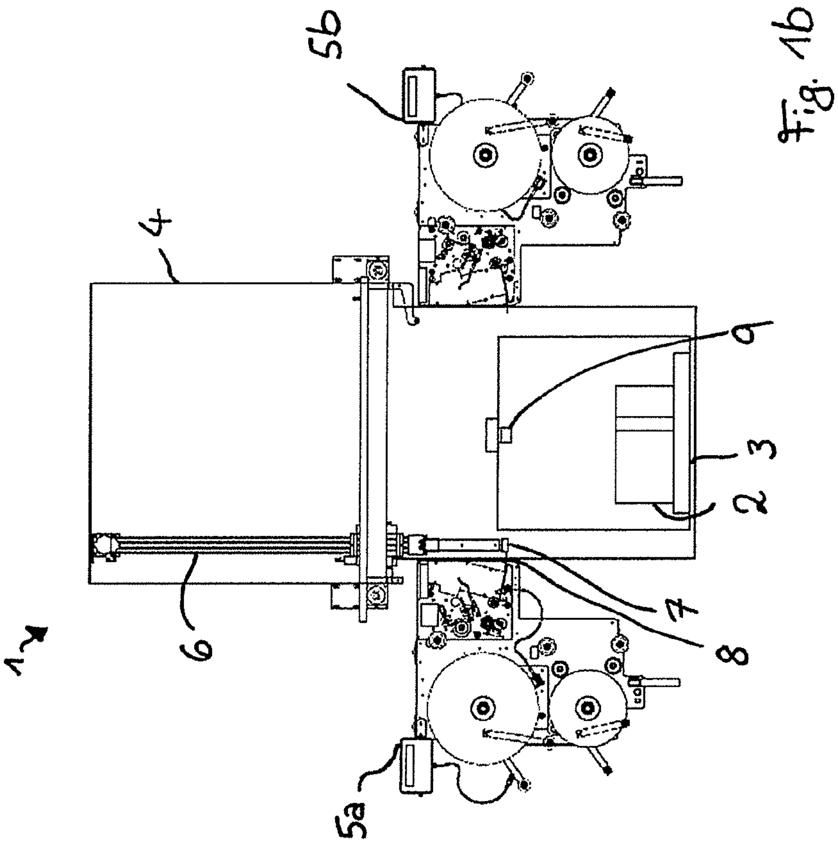
FIG. 1*b*: a side view of the labeling device in the first operating position according to FIG. 1*a;*
Figure 1A:
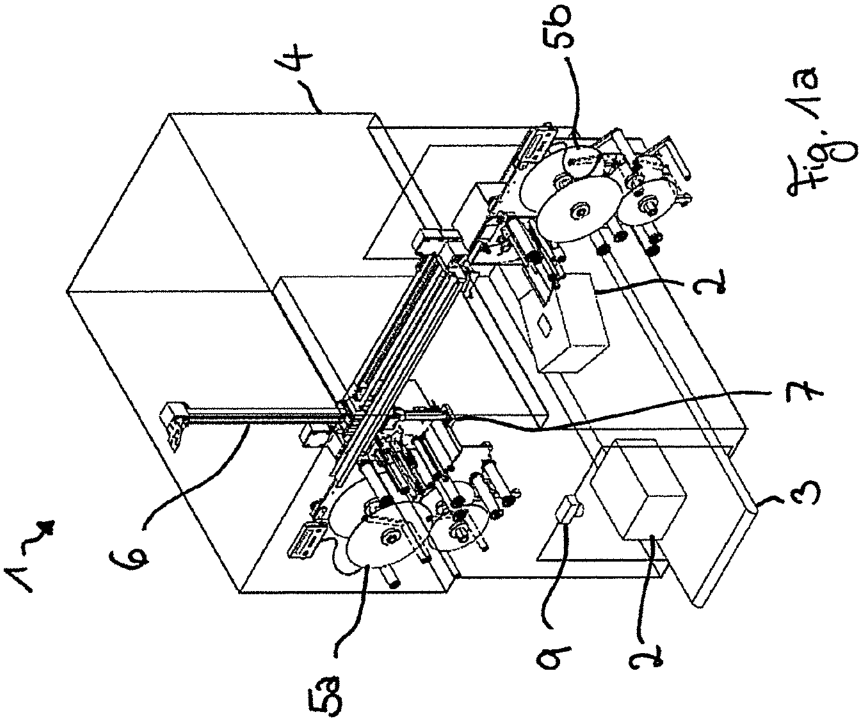
FIG. 1*a*: a perspective view of a labeling device according to the invention in a first operating position.

FIG. 1*a* shows a labeling device 1 according to the invention in a perspective view in a first operating position. FIG. 1*b* shows a side view of the first operating position. In the first operating position, a label transfer takes place. Several products 2 are arranged on a conveyor 3, which passes through an application cell 4 of the labeling device 1. Before entering the application cell 4, the product 2 is detected by a measuring system 9. This measures the size and shape of the product 2 as well as its exact position and arrangement on the conveyor 3. The recorded data are forwarded by the measuring system 9 to a control unit. This positions an applicator 6 on a label dispenser. The label dispenser 5*a* transfers the label to the transfer unit 7 of the applicator 6 via a transfer gap 8. The transfer unit 7 holds the label, for example by means of negative pressure, until the applicator 6 subsequently moves to a second operating position and can place the label on the product 2. The applicator 6 can be fed with labels during ongoing operation of the labeling device 1 from the two label dispensers 5*a,b* arranged opposite each other. For this purpose, the applicator can be moved flexibly along a linear axis to the label dispensers 5*a,b*. However, it can also be set to approach only one label dispenser 5*a* or 5*b*. This makes it possible to carry out maintenance work on the other label dispenser 5*a,b* during operation or to load it with new material, for example, when a label roll has been used up.

Figure 2B:
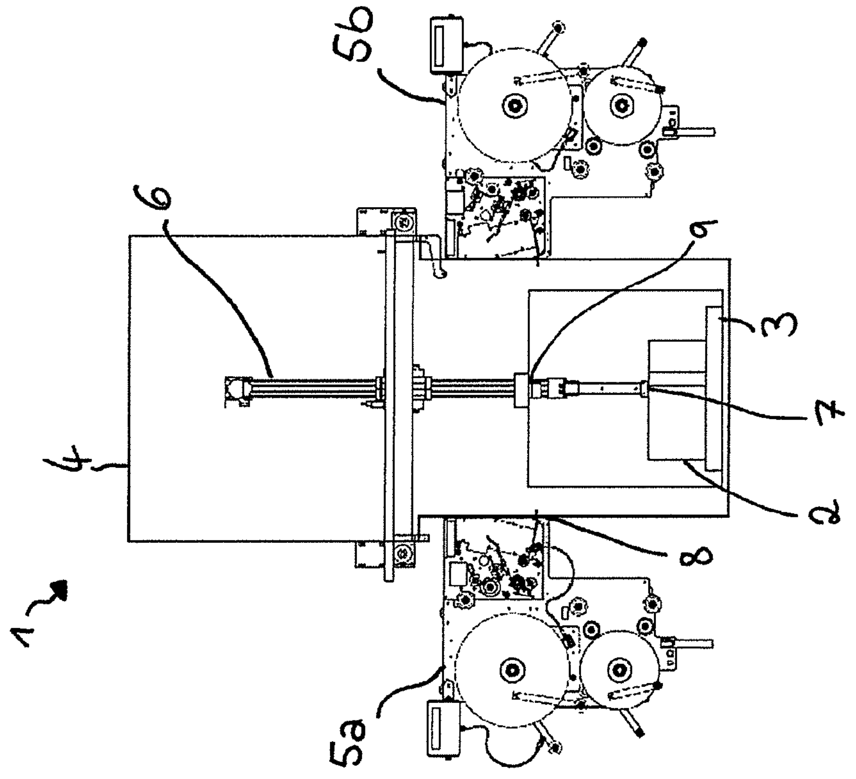
FIG. 2*b*: a side view of the labeling device in the second operating position according to FIG. 2*b*.
Figure 2A:
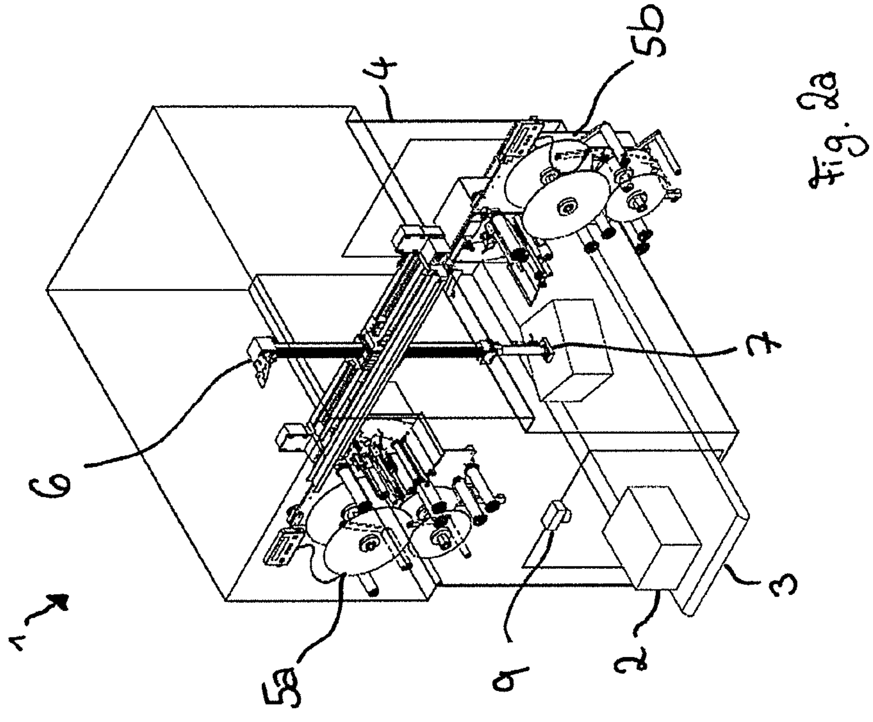
FIG. 2*a*: the labelling device according to the invention in a perspective view in a second operating position.

FIG. 2*a* shows the labeling device 1 according to the invention in a perspective view in the second operating position. FIG. 2*b* shows a side view of the second operating position. In the second operating position, the application of the label to the product 2 to be labeled takes place. The product 2 to be labeled is located on the conveyor 3 and its exact position is detected by the measuring system 9 as it enters the application cell 4. The applicator 6, to whose transfer unit 7 the label to be applied is detachably fixed, can be moved to a suitable dispensing position with the aid of this data in order to apply the label to the product 2. By arranging the label dispensers 5*a,b* opposite each other, the control unit can guide the applicator 6 to the label dispenser 5*a,b* that enables a faster transfer (for example, by a shorter path of the applicator to the label dispenser 5*a,b* and/or to the product 2 to be labeled).

The invention claimed is:

1. A labeling device for applying a label to a product located on a conveyor, comprising:
- an application cell;
- at least two label dispensers arranged outside the application cell which is not accessible and is closed from outside manipulation during operation of the labeling device; and
- an applicator mounted inside the application cell, wherein the applicator is adapted for labeling the product at variable positions on the conveyor individually detected by a measuring system at variable conveyor speeds;
- wherein the applicator comprises a transfer unit for receiving and dispensing the label, and wherein the transfer unit is adapted for receiving labels from the at least two label dispensers during operation of the labeling device.

2. A labeling device according to claim 1, wherein two of said label dispensers are arranged on opposite sides of the conveyor.

3. A labeling device according to claim 1, wherein the transfer unit detachably fixes the label by negative pressure.

4. A labeling device according to claim 1, wherein the transfer unit dispenses the label by compressed air.

5. A labeling device according to claim 4, wherein the compressed air is adapted to be varied in a distributed manner over the surface of the transfer unit.

6. A labeling device according to claim 1, wherein the applicator receives the label from one said label dispenser at a transfer gap in the application cell.

7. A labeling device according to claim 6, further comprising a transfer aid provided at the transfer gap for temporarily fixing the label.

8. A labeling device according to claim 1, wherein the applicator is linearly movable over at least two axes.

9. A labeling device according to claim 1, wherein at least one label dispenser comprises a label printer.

10. A labeling device according to claim 1, wherein the measuring system forwards detected position data of the product to a control unit, which aligns the applicator with positional accuracy.

11. A labeling device according to claim 1, wherein the labeling device is operable when at least one label dispenser is operable.

12. A labeling device according to claim 10, wherein the control unit calculates a label position on the product.

13. A labeling device according to claim 10, wherein the control unit stores position data of successive products transmitted by the measuring system.

14. A method for applying a label by a labeling device according to claim 1, comprising the following steps:

moving the applicator into a receiving position;

dispensing the label from one said label dispenser;

receiving the label by the applicator;

acquiring position data of the product;

moving the applicator to a dispensing position; and applying the label to the product by the applicator.

* * * * *